(12) United States Patent
Franceschi et al.

(10) Patent No.: US 9,914,496 B2
(45) Date of Patent: Mar. 13, 2018

(54) FRAME FOR AN UNMANNED GROUND VEHICLE OR UGV

(71) Applicant: OTO MELARA S.P.A., La Spezia (IT)

(72) Inventors: Giuliano Franceschi, La Spezia (IT); Andrea Giovannini, La Spezia (IT); Claudio Scarpellini, La Spezia (IT)

(73) Assignee: OTO MELARA S.P.A., La Spezia (IT)

( * ) Notice: Subject to any disclaimer, the term of this patent is extended or adjusted under 35 U.S.C. 154(b) by 0 days.

(21) Appl. No.: 14/902,467

(22) PCT Filed: Jun. 30, 2014

(86) PCT No.: PCT/IB2014/062738
§ 371 (c)(1),
(2) Date: Dec. 31, 2015

(87) PCT Pub. No.: WO2015/001470
PCT Pub. Date: Jan. 8, 2015

(65) Prior Publication Data
US 2016/0311480 A1    Oct. 27, 2016

(30) Foreign Application Priority Data
Jul. 1, 2013  (IT) .............................. TO2013A0544

(51) Int. Cl.
*B62D 55/10*   (2006.01)
*B62D 55/084*  (2006.01)
(Continued)

(52) U.S. Cl.
CPC ............. *B62D 55/10* (2013.01); *B62D 21/14* (2013.01); *B62D 21/18* (2013.01); *B62D 55/06* (2013.01);
(Continued)

(58) Field of Classification Search
CPC ........ B62D 55/10; B62D 55/32; B62D 55/28; B62D 21/18; B62D 55/06; B62D 21/14; B62D 55/084; F41H 7/005
See application file for complete search history.

(56) References Cited

U.S. PATENT DOCUMENTS 4,709,773 A * 12/1987 Clement .............. B62D 55/065
                                                         180/9.32
5,435,405 A *  7/1995 Schempf ................... B08B 9/08
                                                          180/9.1
(Continued)

FOREIGN PATENT DOCUMENTS

EP      0197020 A1    10/1986
EP      1798139 A2     6/2007
(Continued)

OTHER PUBLICATIONS

International Search Report for International Patent Application No. PCT/IB2014/062738 (dated Aug. 22, 2014).

*Primary Examiner* — Darlene P Condra
(74) *Attorney, Agent, or Firm* — Merchant & Gould P.C.

(57) ABSTRACT

A frame includes a pair of self-propelled lateral modules, which extend in a longitudinal direction and can be mutually removably coupled in a transverse direction. The modules are adapted to contribute to create, when assembled, a support structure for a central module, which can be removably coupled to the frame and is provided with a control system, which is configured to control movements and actuation of the self-propelled lateral modules. Each one of the self-propelled lateral modules includes a pair of bearing portions, and a connection portion, which mutually constrain the bearing portions and permit relative movement thereof between an extended configuration, in which the bearing portions define a greater longitudinal extension of the self-propelled lateral module, and a compact configuration, in (Continued)

which the bearing portions define a smaller longitudinal extension of the self-propelled lateral module.

10 Claims, 2 Drawing Sheets

(51) Int. Cl.
    *F41H 7/00*     (2006.01)
    *B62D 21/14*     (2006.01)
    *B62D 21/18*     (2006.01)
    *B62D 55/06*     (2006.01)
    *B62D 55/28*     (2006.01)
    *B62D 55/32*     (2006.01)

(52) U.S. Cl.
    CPC ............ *B62D 55/084* (2013.01); *B62D 55/28* (2013.01); *B62D 55/32* (2013.01); *F41H 7/005* (2013.01)

(56) References Cited

U.S. PATENT DOCUMENTS

| | | | |
|---|---|---|---|
| 6,263,989 B1 | 7/2001 | Won | |
| 7,575,076 B2* | 8/2009 | Kang | B25J 5/005 180/9.34 |
| 7,654,348 B2* | 2/2010 | Ohm | B25J 5/005 180/8.2 |
| 7,784,570 B2* | 8/2010 | Couture | B25J 5/005 180/65.8 |
| 8,413,752 B2* | 4/2013 | Page | B25J 5/005 180/68.5 |
| 8,434,576 B1 | 5/2013 | Ferguson | |
| 8,644,991 B2* | 2/2014 | Ohm | G05D 1/0246 180/9.3 |
| 2007/0137902 A1* | 6/2007 | Franceschi | B62D 55/065 180/9.1 |
| 2007/0209844 A1* | 9/2007 | Kamimura | B62D 55/0655 180/9.32 |
| 2010/0059298 A1* | 3/2010 | Pelrine | B62D 57/00 180/9 |
| 2011/0036650 A1 | 2/2011 | Simula et al. | |
| 2011/0240383 A1* | 10/2011 | Gettings | B62D 55/075 180/9.1 |
| 2012/0185091 A1* | 7/2012 | Field | G05D 1/0044 700/254 |
| 2013/0268118 A1* | 10/2013 | Grinstead | B25J 19/023 700/259 |
| 2015/0210327 A1* | 7/2015 | Wolf | B62D 55/084 180/9.28 |

FOREIGN PATENT DOCUMENTS

| | | |
|---|---|---|
| EP | 1832501 A2 | 9/2007 |
| JP | 2004224146 A | 8/2004 |

\* cited by examiner

FRAME FOR AN UNMANNED GROUND VEHICLE OR UGV

This application is a National Stage Application of International Patent Application No. PCT/IB2014/062738, filed 30 Jun. 2014, which claims benefit of Serial No. TO2013A000544, filed 1 Jul. 2013 in Italy and which applications are incorporated herein by reference. To the extent appropriate, a claim of priority is made to each of the above disclosed applications.

TECHNICAL FIELD

The present invention relates to a frame for an unmanned ground vehicle or UGV.

TECHNOLOGICAL BACKGROUND

In the technical field, unmanned ground vehicles are known, which are also called, with an acronym, UGVs.

A vehicle of the type mentioned above operates while it is in contact with the ground and without the need for human beings on board. These vehicles can be used for many applications in which having a human operator can be uncomfortable, dangerous or impossible. Furthermore, this type of vehicles is actively becoming popular both in the civil field and in the military field to perform a series of different activities and missions in several operating scenarios.

Known unmanned ground vehicles suffer from some drawbacks.

One drawback lies in the fact that they are difficult to be directly transported to the scenario in which they have to operate. In fact, they typically have large dimensions and a remarkable weight and, therefore, operators generally need to use carriers with a large loading capacity to handle and transport them to the regions where these vehicles have to be transported. Clearly, the use of these carriers requires the use of dedicated apparatus that are very large and not very practical to use, which limits the field and the actual modes of use of the vehicles manufactured according to the state of the art.

SUMMARY OF THE INVENTION

An object of the present invention is to provide a frame for an unmanned ground vehicle or UGV, which is able to solve this and other drawbacks of the prior art and which, at the same time, can be produced in a simple and economic fashion.

In particular, one of the technical problems solved by the present invention is that of providing a frame that allows the unmanned ground vehicle including it to be able to be transported in an easy manner, not necessarily with the use of carriers or special and dedicated apparatuses, but in a simple manual fashion, with the aid of a reduced number of operators, even over long distances, so that each operator has to transport a load having a size and a weight that can be compared to those typically transported during a mission.

According to the present invention, this and other objects are reached by a frame.

Technical teachings are provided in the following detailed description concerning the present invention.

BRIEF DESCRIPTION OF THE DRAWINGS

Further features and advantages of the present invention will be best understood upon perusal of the following detailed description, which is provided by way of example and is not limiting, with reference, in particular, to the accompanying drawings, wherein.

DETAILED DESCRIPTION OF THE INVENTION

Figure 1:
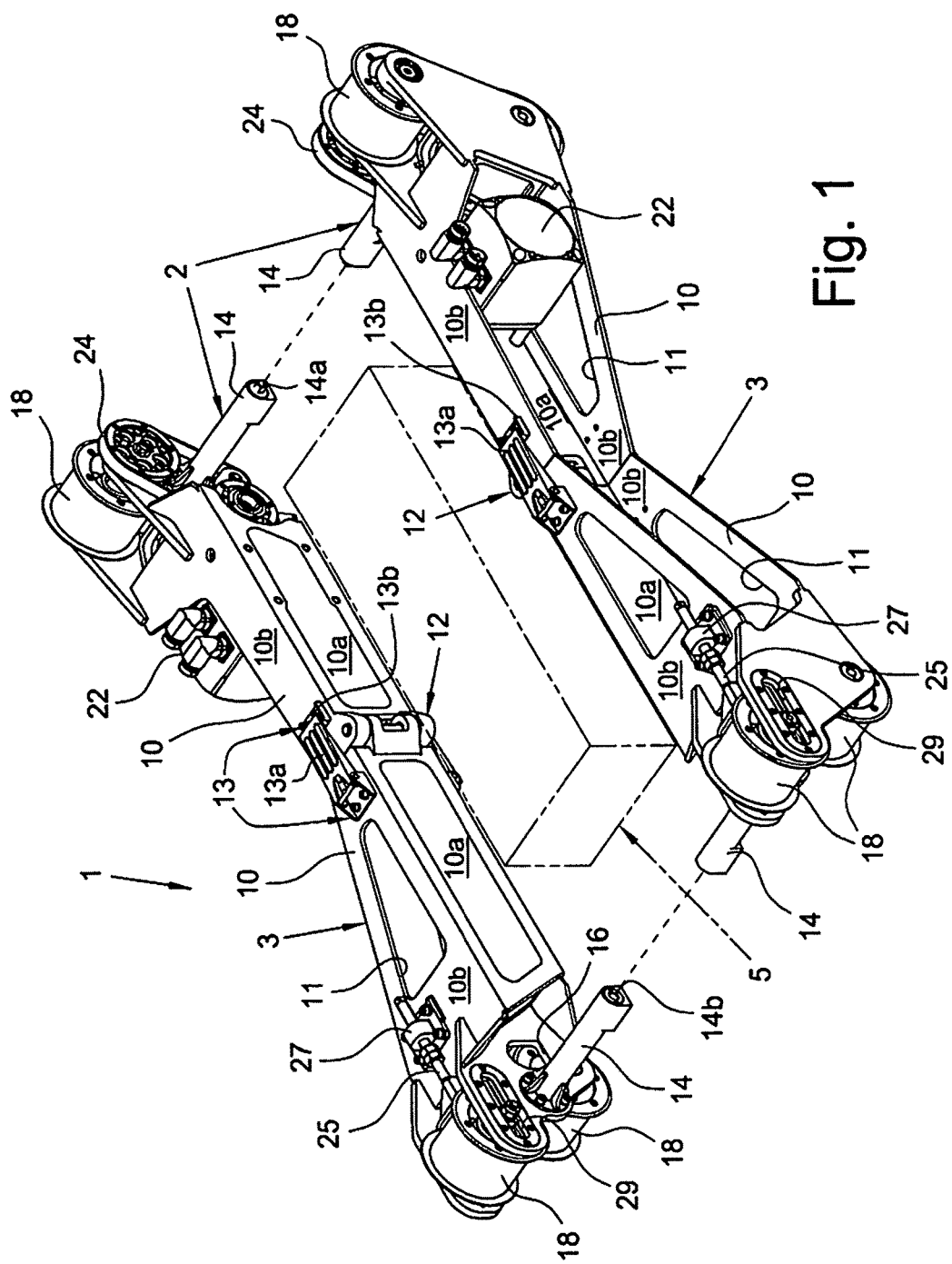
FIG. 1 is a perspective exploded view of a frame for an unmanned ground vehicle or UGV manufactured according to an explanatory embodiment of the present invention.
Figure 2:
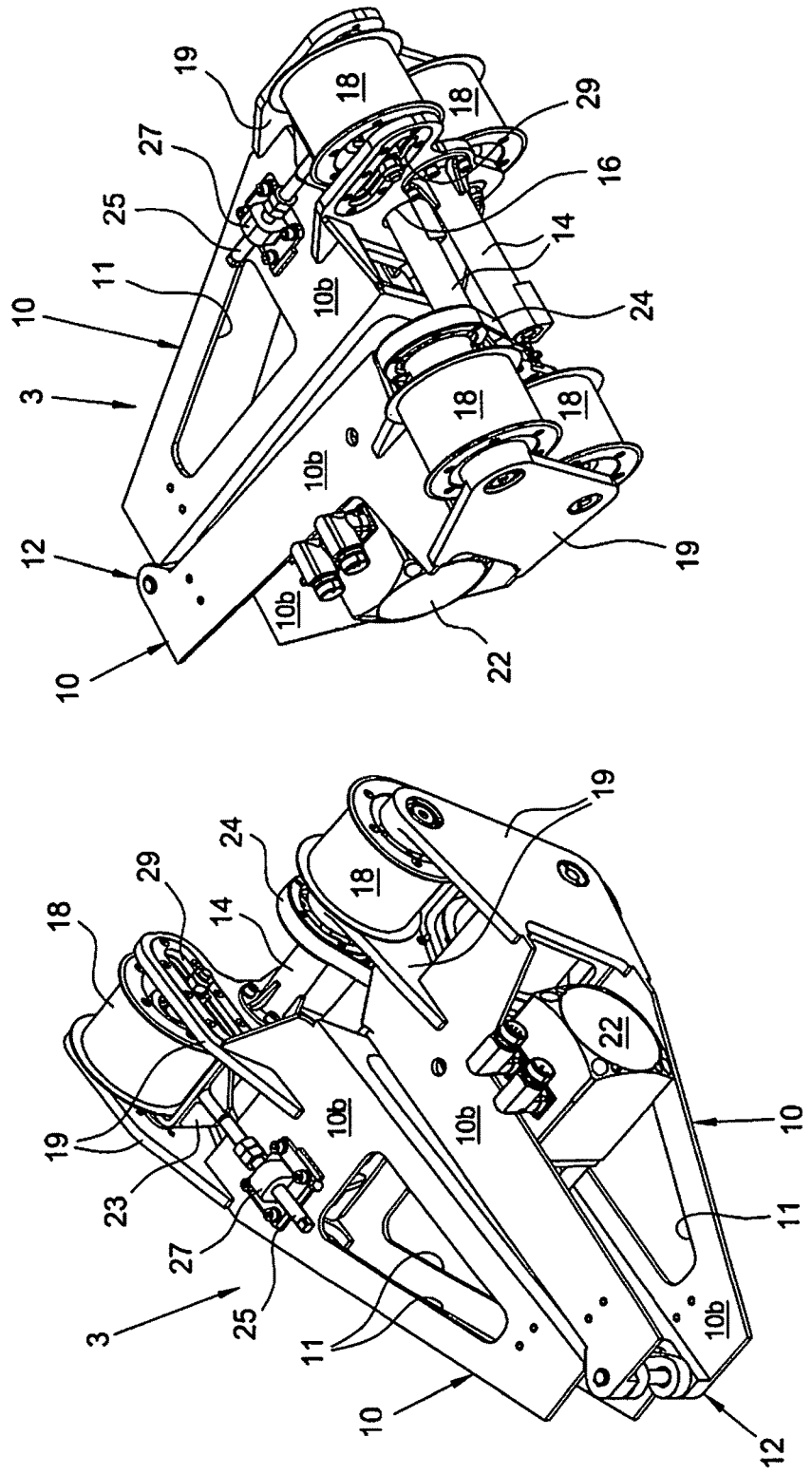
FIG. 2 is a perspective view of the frame shown in FIG. 1, whose lateral modules are disassembled and shown in a compact configuration.

With reference, in particular, to FIGS. 1 and 2, number 1 indicates, as a whole, an unmanned ground vehicle or UGV having a frame 2 manufactured according to a preferred explanatory embodiment of the present invention.

As you can see, in particular, in FIG. 1, frame 2 comprises a pair of self-propelled lateral modules 3, extending in a longitudinal direction and can be mutually coupled in a transverse direction and in a removable manner.

Furthermore, vehicle 1 comprises a central module 5, which is drawn with a broken line with long and short segments and can be coupled in a removable manner to frame 2 by means of solutions that are known to a person skilled in the art. Central module 5 is generally provided with a control system, which is configured to be connected to and to control the movements and the actuation of self-propelled lateral modules 3.

In the embodiment shown, central module 5 is connected to frame 2 by means of (known) releasable locking means, which, in particular, are arranged on one or more of self-propelled lateral modules 3 and are able to firmly hold central module 5 during all the operating phases, thus ensuring its correct and reliable operation.

Similarly to locking system 13 of connection portion 12 (the figures show a hinge) of lateral module 5 described below, in a preferred embodiment that is not shown, the releasable locking means comprise a hook which is mounted so as to pivot relative to one between central module 5 and lateral module 3 and can be coupled to a complementary striker, for example manufactured as a projection, carried by the other module, 5.

In order to carry out the connection between the aforesaid parts 3, 5, further variants are possible that are described by mere way of example and do not limit the scope of protection of the present invention. For example, one can use snap joints, bayonet joints, quick release joints and joints by means of bolts, screws, etc.

Preferably, each lateral module 3 comprises a pair of bearing portions 10, and a connection portion 12, which mutually constrains bearing portions 10. When the lateral modules 3 are decoupled from one another or disassembled, connection portion 12 is able to permit a relative movement of bearing portions between 10 an extended configuration (FIG. 1), in which bearing portions 10 define a greater longitudinal extension of lateral module 3, and a compact configuration (FIG. 2), in which bearing portions 10 define a smaller longitudinal extension of lateral module 3.

Preferably, self-propelled lateral modules 3 are substantially identical to one another and are mounted in a substantially symmetrical manner relative to a longitudinal axis of the frame 2.

In the embodiment shown, self-propelled lateral modules 3 are mutually constrained, so as to be in a parallel position during the use of vehicle 1, thus allowing it to move in the field.

In particular, central module 5 is constrained between the two lateral modules 3 and, together with them, forms a single vehicle, which, in use, is able to maintain its ability to function and to firmly keep all the elements making it up in their position.

With reference, in particular to FIG. 2, one can see in detail self-propelled lateral modules 3, shown in a compact configuration, which—after having been coupled—help form the support structure or frame 2 of vehicle 1 according to the present embodiment of the invention.

As described above, lateral module 3 comprises two bearing portions 10, which are mutually constrained to connection portion 12, so that bearing portions 10 can perform a relative movement between the extended configuration and the compact configuration. In the embodiment shown, connection portion 12 is an interface area between bearing portions 10, through which bearing portions 10 are coupled to one another.

In particular, when vehicle 1 is assembled and ready to be used, bearing portions 10 of lateral module 3 are in the extended configuration and are aligned according to a longitudinal direction (see FIG. 1); when, on the other hand, vehicle 1 is disassembled, bearing portions 10 are in the compact configuration, so as to reduce their dimensions (see FIG. 2). In this way, each one of them can be manually transported by a single operator. Finally, another operator transports the central module after it has been disassembled. Hence, in the embodiment shown, single modules 3, 5 of the vehicle can be transported by three operators, each one of them being able to load a respective module in a backpack to be carried on his shoulders.

Preferably, connection portion 12 is manufactured as an articulated joint the connects bearing portions 10. This articulated joint is able to permit a mutual rotation of bearing portions 10 between the extended configuration and the compact configuration. In the embodiment shown, the aforesaid articulated joint is created by portions of each one of bearing portions 10 that are properly connected to one another.

In the embodiment show, connection portion 12 is an articulated joint comprising a hinge arranged between the two bearing portions 10. According to these features, the extended configuration corresponds to a mutual substantially spread position of bearing portions 10, whereas the compact configuration corresponds to a mutual substantially folded position of bearing portions 10. In particular, in the compact configuration bearing portions are laterally close to one another and preferably juxtaposed against one another.

According to the present embodiment, when the vehicle is disassembled, in order to bring lateral module 3 to the folded configuration, operators can keep one of the two bearing portions 10 still and—at the same time—rotate the other one of the two bearing portions 10 towards the inside, thus causing bearing portions 10 to be aligned one next to the other, which significantly reduces the length of lateral module 3.

Preferably, connection portion 12 defines a hinging axis between bearing portions 10, which is oriented in a substantially orthogonal direction relative to the bearing surface defined by the support structure. For example, the hinging axis is substantially vertical, so as to cause the two bearing portions 10 to rotate in a substantially horizontal plane between the two configurations, the extended one and the compact one.

In the embodiment show, at least one of bearing portions 10 comprises a bar, in particular a bar with a bordered. Preferably, the bar has a concave profile that transversely faces the outside of the lateral module, for example a C-shaped profile. In particular, intermediate branch 10a of this C is oriented in a substantially vertical plane, whereas the relative end wings 10b lie on substantially horizontal planes that are spaced apart (the details are not numbered). In particular, both bearing portions 10 of the same lateral module 3 comprises a bar with a shaped profile manufactured as described above.

In the embodiment shown, intermediate branches 10a are suited to be angularly brought closer and to be preferably juxtaposed one against the other, when bearing portions 10 are brought to the compact configuration.

Preferably, at least one of end wings 10b projects outwards by a quantity that increases transversely, in particular in a substantially linear manner, from intermediate portion 12 towards the end of bearing portion 10 associated therewith. In the embodiment shown, at least one of end wings 10b has a substantially trapezoidal (or, if necessary, triangular) shape and preferably has a window (for example, a window with a substantially corresponding shape, such as a trapezoidal or, if necessary, triangular shape).

With reference, in particular, to FIG. 1, lateral module 3 is preferably provided with releasable locking means 13, which, when activated, are able to lock bearing portions 10 in the extended configuration, thus preventing them from accidentally going back to the compact configuration. In the embodiment shown, releasable locking means 13 comprise a hook 13a, which is mounted so as to pivot relative to one of bearing portions 10 and can be coupled to a complementary striker 13b, for example manufactured as a projection, carried by the other adjacent bearing portion 10. In particular, hook 13a and striker 13b are mounted in correspondence to end wings 10b of the respective bearing portions 10. In particular, hook 13a and striker 13b are carried by the respective end wings 10b that are operatively arranged on top of bearing portions 10; in the embodiment shown, hook 13a can rotate around a substantially transverse axis (as an alternative, it is possible for it to rotate around a vertical axis).

With reference, in particular, to the embodiment shown in FIGS. 1 and 2, each one of bearing portions 10 of lateral module 3 comprises a transverse half-shaft 14, in particular projecting inwards. Transverse half-shaft 14 is able to be connected, in a removable manner, to a corresponding transverse half-shaft 14—also projecting inwards—supported by an associated bearing portion 10 of the other lateral module 3. In this way, the two pairs of half-shafts 14, when they are joined and coupled to one another, form two crosspieces that mutually connect, in a transverse direction, bearing portions 10, in particular on opposite sides of the longitudinal direction thereof.

Preferably, each one of transverse half-shafts 14 is arranged on respective bearing portion 10 in a longitudinally opposite position relative to connection portion 12, in particular close to the free end of the aforesaid bearing portion. In this way, the two lateral modules 3 are firmly constrained in a mutual manner and permit the creation of the frame or support structure 2 on which central module 5 is fixed.

Preferably, half-shafts 14 are tubular and can be mutually coupled one inside the other, for example with a clearance in a transverse direction relative to the joining axis of the half-shafts. The coupling takes place, in particular, by bringing half-shafts 14 close in correspondence to their axial ends 14a, 14b that mutually face one another, for example of the male-female type. In the embodiment shown, the coupling between half-shafts 14 takes place by means of a pin 14a carried by one of half-shafts 14 and by means of a hole 14b made in the other half-shaft 14.

Preferably, even though this is not shown in the figures, bearing portions 10 are mutually constrained in a transverse direction and in a releasable manner through the coupling of half-shafts 14, which is held in place thanks to suitable locking means, which are similar to the ones described for the connection between the two bearing portions 10 of the same lateral module 3 and identified by number 13. In the embodiment shown, the locking means are supported by the face of half-shafts 14 that operatively faces the ground.

In the embodiment shown, at least one of transverse half-shafts 14, supported by one of baring portions 10 of lateral module 3, can be housed in a seat 16 obtained in the other bearing portion 10 of lateral module 3, when lateral module 3 is brought to the compact configuration. Preferably, this structure is applied to both lateral modules 3. In this position, the presence of seat 16 in one of bearing portions 10 is advantageous because it permits the housing of one of transverse half-shafts 14, so as to allow the two bearing portions 10 comprised in lateral module 3 to completely rotate, thus getting one close—and in particular juxtaposed—to the other.

In the embodiment shown, bearing portion 10 in which seat 16 is obtained has a longitudinal size that is greater than the longitudinal size of the other bearing portion 10. In this way, the combination between the length difference of the two bearing portions 10 and the presence of seat 16 makes it easier for bearing portions 10 to be brought closer to one another, so as to be mutually juxtaposed.

Preferably, the seat comprises an opening or cavity 16, in which respective half-shaft 14 can be housed in bearing portion 10 associated therewith. In the embodiment shown, opening or cavity 16 is manufactured as a slot that transversely passes through bearing portion 10.

With reference to the non-limiting embodiment shown, at least one bearing portion 10 comprises, preferably close to the longitudinal end areas of lateral module 3, a mounting 18, which is adapted to receive, in a removable manner, traction member, such as tracks or wheels, which are capable of transferring a driving force to the ground, thus allowing vehicle 1 to move. In the embodiment shown, both bearing portions 10 of lateral module 3 are provided with mountings 18.

In the embodiment shown in the figures by way of example, mounting 18 is arranged in a transversely external position, when lateral modules 3 are assembled. In this way, as shown in FIG. 4, when there are two mountings 18, which, in particular, both face the outside of the same lateral module 3, and when they are both brought to the compact position, they are in an opposite position relative to mutually folded bearing portions 10 and, hence, respectively face outwards, on opposite sides, relative to bearing portions 10.

In case traction members are tracks, like in the example shown, mounting 18 comprises at least one roller—or a toothed wheel—to be engaged, in a removable manner, with said tracks. Similarly, in case the traction is provided by at least one wheel, the mounting comprises at least one hub or shaft, on which said wheel can be coupled in a removable manner.

Vehicle 1 comprises, furthermore, at least one motor 22, which, in particular, is arranged on a lateral module 3 (preferably two motors, both arranged as shown in FIGS. 1 and 2) and is able to deliver a driving power to at least one of mounting 18 available on one or both lateral modules 3. Preferably, motor 22 is an electric motor.

In particular, motor 22 is adapted to transfer the driving power to mounting 18 by means of a transmission device, for example comprising at least one belt 24. In the embodiment shown, the output shaft of motor 22 is connected to mounting 18 through a transmission device comprising a plurality of belt transmission stages 24. Clearly, according to further non-limiting variants, the transmission device can comprise other mechanical devices able to fulfil the same function, such as, for example, gears, chains, racks, connecting rods; furthermore, the transmission device can also comprises a combination of the members mentioned above.

Preferably, when lateral modules 3 are assembled to one another, relative motors 22 are arranged in substantially symmetrical positions relative to the longitudinal axis of frame 12, so as to deliver a traction that is generated from the same part of the vehicle 1, from the front part or from the real part.

There is also a further variant according to the present invention, in which the traction members are wheels that are adapted to be coupled to the mountings. Based on the operating needs of the mission to be accomplished, on the type of ground to be worked on and on any other type of need, in this hypothesis, a motor can be associated to each mounting by means of the transmission members. In particular, when each wheel of the vehicle is connected to the motor and, hence, is able to autonomously develop a driving force, we obtain a "four-wheel drive" system, which can be particularly advantageous when the vehicle has to work on grounds with a reduced grip, for example due to a sharp incline, to the presence of water or to an uneven path.

In the embodiment shown, mounting 18 is supported, during its rotation, by bearing portion 10 in a substantially rigid manner.

In the embodiment shown, mounting 18—in particular a roller—is supported, during its rotation, between a pair of lateral plates 19 which are transversely arranged one next to the other and are placed in correspondence to the free end of respective bearing portion 10. In particular, lateral plates 19 are supported by the bar with a bordered profile contributing to the formation of bearing portion 10, for example they are carried by wings 10b, preferably in the end area in which they have the largest transverse projection towards the outside.

Preferably, at least one of bearing portions 10 is provided with system to move at least one of mountings 18 in a guided manner. This solution—in case it is applied to a single one of mountings 18 for each one of lateral modules 3—is particularly useful in case traction members are tracks because, in this way, operators can adjust their tightening in an easy manner. In the embodiment shown, the system comprises a bracket 23 (one is shown in FIG. 2), which supports one of mountings 18 (in this case a roller) during its rotation and, in particular, is slidingly connected in a guided manner between lateral plates 19. Bracket 23 has a rod appendage 25, which is constrained to bearing portion 10 associated therewith in an adjustable manner (in particular, in correspondence to one of end wings 10b). The adjustable constraint is carried out, for example, by means of a threaded coupling to an associated member, indicated, as a whole, with number 27. Besides that, slots 29 are preferably obtained through lateral plates 19, so as to allow a rotation pin of mounting 18—with its ends—and/or transverse projections of bracket 23 to pass through aforesaid slots 29, in order to constrain the movement of mounting 18 relative to bearing portion 10.

In the embodiment shown, seat 16, which is suited to house one of half-shafts 14, is obtained in one of lateral plates 19.

In this embodiment, seat 16 is obtained through intermediate branch 10a of the bar contributing to the formation of the bearing portion.

Moreover, instead of the embodiments described above, further embodiments (not shown) can be adopted, which mainly differ from one another for the way in which connection portion 12 between bearing portions 10 is manufactured.

According to a variant, three or more bearing portions can be provided, which are connected to one another by two or more hinges vertical thereto, which allow operators to pass from a compact configuration to an extended configuration by performing a mutual rotation around a relative hinging axis, preferably oriented in a substantially vertical direction.

According to another variant, a hinge is provided, which has a transverse rotation axis (substantially parallel to the one of the half-shafts), which is able to cause the bearing portions to rotate in a vertical plane, so as to permit the transition between the two limit configurations; in this variant, in the compact configuration, the mountings are both on the outer side of the lateral module of which they are part.

According to a further variant, the connection portion comprises a telescopic mechanism such as to permit the transition between the two limit configurations through the sliding movement of the bearing portions along two parallel and, if necessary, coinciding axes.

Naturally, the principle of the present invention being set forth, the embodiments and the implementation details can be widely changed with respect to what described above and shown in the drawings as a mere way of non-limiting example.

The invention claimed is:

1. A frame for an unmanned ground vehicle, said frame comprising a pair of self-propelled lateral modules, which extend in a longitudinal direction and are mutually removably coupled in a transverse direction;
   said self-propelled lateral modules being assembled to form a support structure for a central module, which is removably coupled to said frame and is provided with a control system, which is configured to control movements and actuation of said self-propelled lateral modules;
   at least one of said self-propelled lateral modules comprising:
      a pair of bearing portions; and
      a connection portion, which mutually constrains said bearing portions and permits relative movement thereof between:
         an extended configuration, in which said bearing portions define a greater longitudinal extension of said self-propelled lateral module, and
         a compact configuration, in which said bearing portions define a smaller longitudinal extension of said self-propelled lateral module;
      wherein said connection portion comprises an articulated joint, which connects said bearing portions, and permits mutual rotation between said extended configuration and said compact configuration;
      wherein said articulated joint is a hinge; said extended configuration and said compact configuration corresponding, to a substantially spread configuration and to a substantially folded configuration of the bearing portions respectively; and
      wherein said hinge defines a hinging axis between said bearing portions oriented in a substantially orthogonal and substantially vertical direction relative to a longitudinal axis of said support structure.

2. A frame according to claim 1, wherein said hinging axis is arranged in a transversely inner position of said lateral module.

3. A frame according to claim 1, wherein at least one bearing portion comprises a mounting for removably receiving traction members transferring a driving force on the ground.

4. A frame according to claim 3, wherein said mounting is situated in a transversely outer position relative to said bearing portion, when said lateral modules are mutually assembled.

5. A frame according to claim 3, further comprising a motor apparatus, which delivers driving power to at least one of said mountings and is arranged on at least one of said lateral modules.

6. A frame according to claim 3, wherein said mounting is rigidly constrained to said bearing portion.

7. A frame according to claim 1, wherein at least one of the bearing portions of one of the lateral modules comprises a transverse half-shaft, which is removably connected to a corresponding transverse half-shaft supported by an associated bearing portion of the other lateral module.

8. A frame according to claim 7, wherein said transverse half-shafts are tubular and are mutually coupled to one another.

9. A frame according to claim 7, wherein at least one of said transverse half-shafts, supported by one of said bearing portions of said lateral module, are housed in a seat obtained in the other bearing portion of said lateral module, when said lateral module is in the compact configuration.

10. A frame according to claim 9, wherein the bearing portion in which said seat is obtained has a longitudinal size that is greater than a longitudinal size of the other bearing portion.

* * * * *